United States Patent [19]

Hardwick

[11] 4,322,760

[45] Mar. 30, 1982

[54] TRIBIT DECODER FOR USE IN A DISC FILE SYSTEM

[75] Inventor: John F. Hardwick, Whinneyknowe, Scotland

[73] Assignee: Burroughs Corporation, Detroit, Mich.

[21] Appl. No.: 96,077

[22] Filed: Nov. 20, 1979

[30] Foreign Application Priority Data

Nov. 29, 1978 [GB] United Kingdom ............... 46439/78

[51] Int. Cl.³ .......................................... G11B 21/10
[52] U.S. Cl. ...................................................... 360/77
[58] Field of Search ........................ 360/77, 78, 75, 86, 360/97-99

[56] References Cited

U.S. PATENT DOCUMENTS

| | | | |
|---|---|---|---|
| 3,534,344 | 10/1970 | Santana | 360/77 |
| 3,691,543 | 9/1972 | Mueller | 360/77 |
| 4,085,427 | 4/1978 | Dunn | 360/77 |
| 4,092,682 | 5/1978 | Andrews, Jr. et al. | 360/77 |
| 4,101,942 | 7/1978 | Jacques | 360/77 |

OTHER PUBLICATIONS

IBM Tech. Disc. Bull., J. Lewkowicz et al., Tri-Bit Servo Detection, vol. 19, No. 3, Aug. 1976, pp. 810-813.

Primary Examiner—Alfred H. Eddleman
Attorney, Agent, or Firm—David G. Rasmussen; Kevin R. Peterson; Edmund M. Chung

[57] ABSTRACT

A moving head disc file for storage of retrievable informational data with one or more tribit tracks recorded on the disc, the tribit tracks being an integral part of the apparatus, the disc file operating under the supervision of a control system and including a tribit signal decoder whose outputs are logic signals coupled to the system controller, particularly aimed at increasing the number of tracks on a moving head magnetic disc file employing "floppy" or flexible discs.

6 Claims, 20 Drawing Figures

Fig-10

TRIBIT DECODER FOR USE IN A DISC FILE SYSTEM

PRIOR ART

A plural track moving head disc file is a common feature of current computer systems and other systems in which retrievable data is stored. The total number of tracks per disc and thus the storage capacity of the disc is limited by radial positioning errors of the transducer over the tracks. This effect has become accentuated with the introduction of flexible discs and is also present in other systems such as laser stored video recordings on plastic discs.

The environmentally related dimensional ch changes of flexible or plastic media cause "large" changes in the disc dimensions and so, consequently, radial positional movement of the information record tracks.

The best way to overcome the limitation is to 'close the loop' around the head and disc by providing feedback of the position of the head relative to the disc and applying a correction equal to the positional error of the head as found by measurement against some known point or points on the disc. In some current devices, apparatus is provided in the disc file for ascertaining the position of the head relative to a servo track or tracks recorded on the disc. These servo tracks are then the 'known points' of the disc. The ascertained position allows computation and application of the required correction.

Of the many particular systems that have evolved, the better prior art systems have included a servo track decoder. U.S. Pat. No. 3,691,453 granted to Meuller, Sept. 12, 1972, discloses how a system, now known as tribits, can be employed as a servo track. Meuller discloses a tribit decoder employing switched analog gates. Meuller's system has found wide acceptance and has been extensively employed.

Difficulties are encountered with Meuller's style of reader because its calibration or sensitivity is a direct function of readback signal amplitude from the disc. Further, its null, center, or balance point is subject to drifts, offsets, and inequality of sensitivity on either side, because of the use of two independent processing channels, one for each of the position peaks of the tribit signal. Much additional circuitry is required to overcome these problems, so making the reader, which is a relatively costly item, even more expensive.

FIELD OF THE INVENTION

The present invention relates to a disc file for storage of retrievable information which works under the supervision of a disc file control system where the disc file includes a rotating disc for data storage in a plurality of concentric tracks together with one or more concentric tribit tracks, a transducer such as a read head, responding to signals on the disc, the transducer being coupled to a positioning mechanism for positioning the transducer radially on the disc, and also includes a tribit decoder into which the transducer readback signal is coupled and whose output is one or more logic signals, indicating the position of the transducer relative to the center of a tribit track, the logic signal or signals being coupled to the disc file control system, which system corrects the transducer positioning mechanism for radial position errors of the transducer.

More particularly, the invention is directed towards increasing the possible number of tracks on a plural track magnetic data storage disc file, so increasing the data storage capacity of a disc.

In particular, "floppy" or flexible disc drives are provided with an improved control system employing a tribit decoder which imparts control information for the transducer positioning mechanism to correctly position the transducer over a desired point on the disc in a manner compatible with the highest track densities.

SUMMARY OF THE INVENTION

According to one aspect of the present invention, there is provided a disc file for retrievable information storage whereby there is provided a disc for concentric track data storage with one or more tribit tracks, disc rotation means, disc transducer positioning means, and reading and writing means via said transducer, which rests adjacent to the surface of the disc, the whole working under the controlling action of a disc file controller, while included in the drive is a tribit track decoder, whose output is coupled to the said controller, so that the controller may cause the positioning means to place the transducer at a desired point with respect to the disc surface by taking account of the tribit track or tracks on the disc. On the best embodiment shown below, the disc is magnetic and the transducer a magnetic head.

According to another aspect of the present invention, there is provided a circuit employing a single peak detector whose output is connected to separator logic which divides the said peak detector output into two sets of pulse streams, each stream separately representing the amplitude of one of the two peaks of the tribit signal.

According to another aspect of the present invention, there is provided a circuit employing a single peak detector whose output is connected to separator logic which divides the said peak detector output into two sets of pulse streams, each stream separately representing the amplitude of one of the two peaks of the tribit signal, the two streams being separately filtered to extract a representation of their mean value and the output of said filters being connected to a voltage comparison circuit which compares variously the filter output signals to each other and to references, providing logic outputs from said voltage comparison circuit.

In the preferred embodiment shown below, the said filter output signals are compared only to each other to provide directional information concerning the sense of the offset of the said transducer from the center of the said tribit track or tracks.

According to another aspect of the present invention, there is provided a circuit employing a single peak detector whose output is connected to separator logic which divides the output of the said peak detector into two sets of pulse streams, each stream separately representing the amplitude of one of the two peaks of the tribit signal: the two streams being separately filtered to extract a representation of their mean value, and the two filter outputs being coupled to an amplifier whose output is a representation of the difference between its two inputs.

Another aspect of the present invention provides a circuit employing a single peak detector, the output of which is connected to separator logic, which separator logic divides the output of the said peak detector into two streams of pulses, each stream separately representing the amplitude of one of the two peaks of the tribit signal, the two streams being connected to further interpretive logic, which interpretive logic examines the mutality or exclusivity of the presence of pulses in the two said streams, the said interpretive logic itself giving logic outputs indicative of its inputs.

According to another aspect of the present invention, there is provided a distinct tribit decoder, employing a circuit utilizing a single peak detector whose output is connected to separator logic, which separator logic divides the said peak detector output into two separate pulse streams, each stream separately representing the amplitude of one of the two position peaks of the tribit signal, followed by:

separate filtering of each of the said streams, the output of each filter being a representation of the mean value of its input, where the output of said filter is connected to voltage comparison circuits which compare the said filter outputs variously with each other and with references to provide logic outputs or separate filtering of each of the said streams, the output of each filter being a representation of the mean value of its input, where the output of said filters is connected to an amplifier, the output of said amplifier being a representation of the difference between the outputs of the two said filters or connection of the two said separate streams to interpretive logic, said interpretive logic examining the mutuality or exclusivity of the presence of pulses in the two said streams, said interpretive logic itself giving logic output indicative of its inputs.

According to another aspect of the present invention, there is provided a magnetic disc file for retrievable information storage whereby there is provided a magnetic disc for concentric track data storage with one or more tribit tracks, means for disc rotation, reading and writing means via a magnetic head, resting adjacent to the surface of said disc, and head positioning means, the whole working under the controlling action of a disc file controller, while included in the drive is a tribit track decoder, the output of said decoder coupled to said controller, the said controller causing the positioning means to place said magnetic head at a desired point with respect to the surface of the said magnetic disc by taking account of the said tribit track or tracks on the surface of the said magnetic disc.

According to another aspect of the present invention, there is provided a disc file for retrievable information storage whereby there is provided: a disc for concentric data track storage, with one or more tribit tracks, means for disc rotation, reading and writing means via a transducer which rests adjacent to the surface of said disc, and head positioning means, the whole working under the control of a disc file controller, while included in the drive is a tribit track decoder whose output is coupled to the transducer positioning means as an error signal, allowing the transducer positioning means to position the transducer at a desired point.

BRIEF DESCRIPTION OF THE DRAWINGS

An understanding of my invention may be had by reference to the followng description with reference to the drawings in which.

Figure 1:
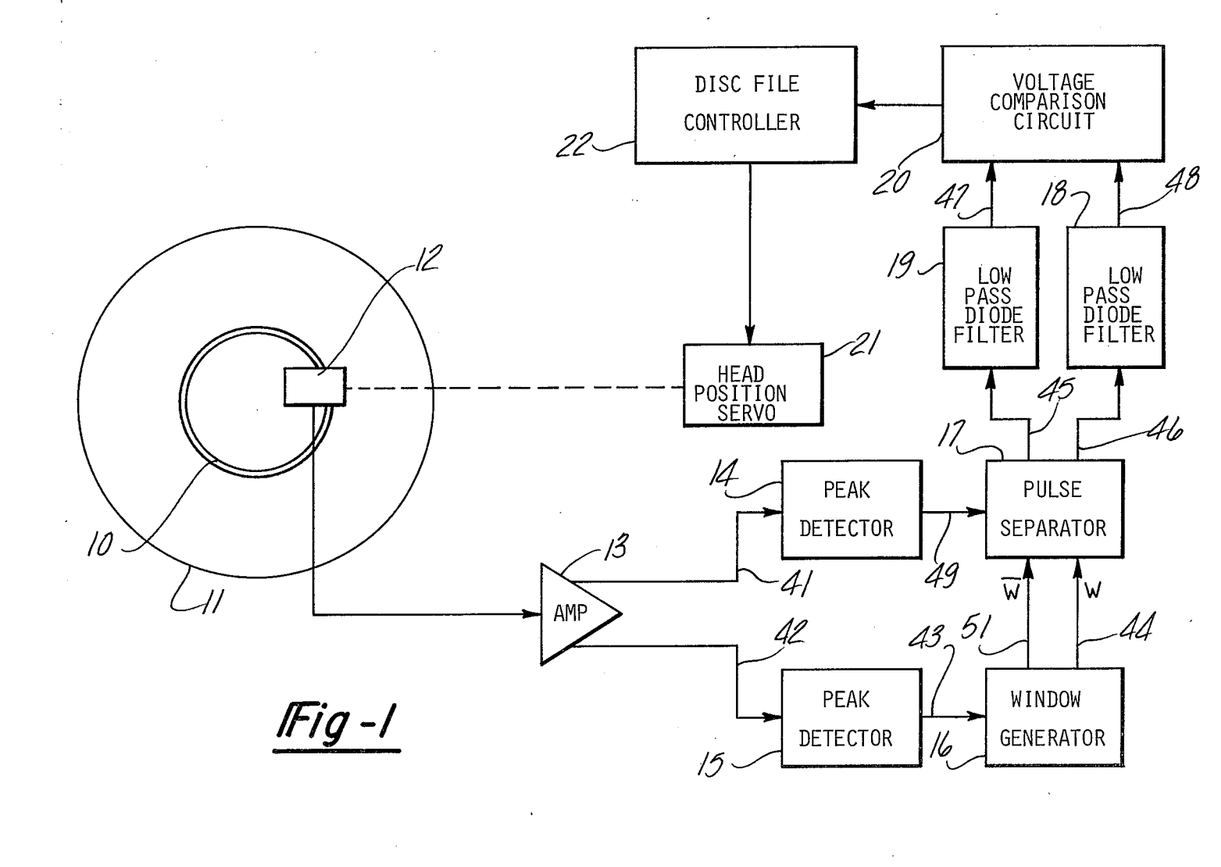
FIG. 1 is a diagrammatic representation of one apparatus constructed in accordance with the present invention.
Figure 2:
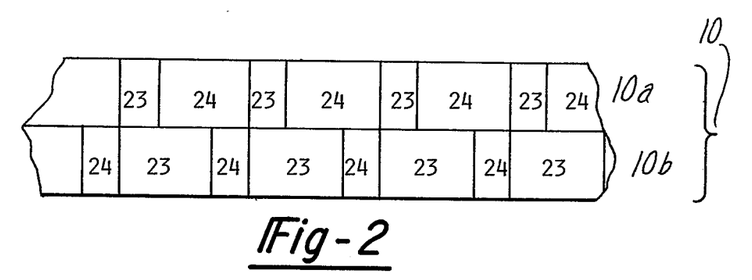
FIG. 2 shows the magnetisation pattern of the tribit trick which is the servo track of FIG. 1.

FIG. 1 shows the preferred embodiment. A magnetic disc, 11 carries on it one or more tribit tracks, 10. A magnetic read/write head, 12, is placed adjacent to the disc, 11, at a desired radius, by a head positioning servo, 21. The head positioning servo, 21 is responsive to signals coupled to it from the disc file controller, 22.

The readback signal of magnetic head, 12, is coupled to an amplifier, 13. The output of the amplifier, 13, consists of two signals, one the inverse of the other. The signal with the position peaks of the tribit signal positive is connected via a connector, 41, to a peak detector, 14. The signal with the timing peaks of the tribit signal positive is connected via a connector, 42, to a peak detector, 15. Output of peak detector, 15 is coupled to a window generator, 16. Output of peak detector, 14, is coupled to pulse separator, 17. Output of peak detector, 14, is an interlaced stream of pulses of two widths, the width of each set being a function of the relative sizes of the position peaks of the tribit signal.

Window generator, 16, has as its output two logic signals, one of the logical inverse of the other, which serve to segregate the two interlaced sets of pulses, being outputs of peak detector 14, into two separate streams, each consisting of pulses of the same width, when applied to pulse separator, 17.

The output of pulse separator 17 consists of two streams of pulses, one on each of connectors 45 and 46. The signals on connectors 45 and 46 are filtered by low pass diode filters, 19 and 18 respectively.

The output of these filters, (18 & 19) is a representation of the mean value of voltage presented at their inputs by the segregated pulse streams.

The outputs of filters 18 and 19 are coupled to a voltage comparison circuit, 20. This circuit compares the voltages present at the output of the filters to each other. The voltage comparison circuit puts out a logic signal indicative of which side of the center of the tribit track, 10, the head, 12, is situated.

This signal, coupled to the disc file controller, 22 provides information about the position of the head (12). The controller (22) may, by moving the head (12) through its control of the head position servo, 21, ascertain the position of the head, 12, relative to the surface of the disc, 11, thus enabling the head (12) to be positioned at a desired point.

The particular operation of the system and its components is explained more fully below.

TRIBIT TRACK CONFIGURATION

Reference to FIG. 1 shows that the tribit track (10) consists of two contiguous components, 10a and 10b, side by side, the magnetization of the areas, 23, being opposite that of the areas, 24. On the two component tracks, the transitions 24 to 23 of of the magnetization are physically aligned, while the transitions 23 to 24 of the magnetization are staggered.

TRIBIT READBACK SIGNAL

Figure 3A:
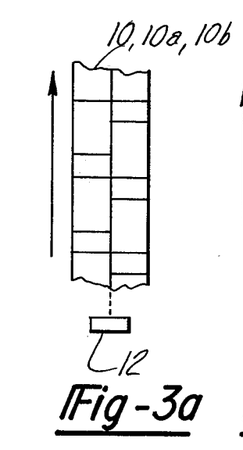
FIGS. 3a to 3c show the readback transducer (a) in the center of the tribit track, (b) to the left of center of the tribit track, (c) to the right of center of the tribit track.
Figure 4A:
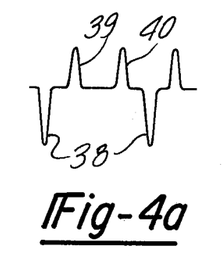
FIGS. 4a to 4c show the readback signal when the readback transducer is (a) over the center of the tribit track (b) to the left of center of the tribit track (c) to the right of center of the tribit track.

FIG. 3a shows the readback head situated in the center of the tribit track (10). That is to say, the head (12) lies equally over each component of the tribit track. The disc moves relative to the head in the direction shown by the arrow FIG. 4a shows the corresponging readback signal. The aligned transitions cause a large, invariable amplitude peak, 38, called the timing peak. The staggered transitions form two smaller peaks of smaller size when read back by the head. They are called first position peak, 39, and the second position peak 40. Together these are known as the position peaks. When the head lies in the center of the tribit track, both position peaks are of equal size.

Figure 3B:
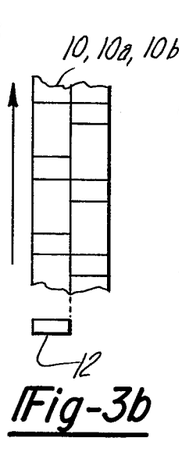
Figure 4B:
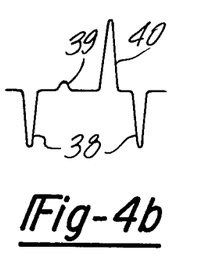
Figure 4C:
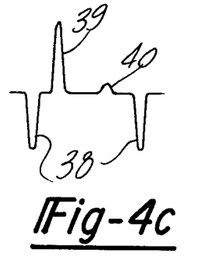

FIG. 3b shows the head (12) situated to the left of center of the tribit track, the disc moves relative to the head in the direction shown by the arrow 10. The head, 12, now lies more over track component 10a than over track component 10b. FIG. 4b shows the corresponding readback signal. The timing peak, 38, is the same size as before, since the aligned transition still covers the full width of the head (12). The first position peak, 39, is now smaller than in FIG. 4a, as the head now lies only a little way over the track component 10b which causes it. The second position peak, 40, is larger than in FIG. 4a, as the head, 12, now lies over the track component, 10a, which causes it, more than before.

Figure 3C:
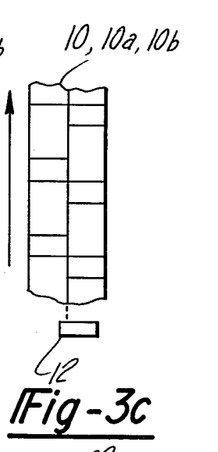

FIG. 3c shows the head, 12, positioned to the right of center of the tribit track, 10, the disc traveling past the head in the direction of the arrow. The timing peak, 38, is the same size as in the two previous examples for the same reason, namely that the aligned transition still covers the entire head (12). This time, the first position peak, 39, has increased in size over the example of FIG. 4a, since the head now lies more over the track component 10b than in FIG. 3a. The second position peak, 40, is smaller than in FIG. 4a because the head now lies less over the track component, 10a, which causes it, than it does in FIG. 3a.

These discreet positions illustrate the action of the tribits. As the head moves across the tribit track, the timing peaks, 38, stay the same size. The position peaks, 39 and 40, continuously change size with position. The sum of the heights of the two position peaks (39 and 40) equals the height of the timing peak (38). Relative difference in height of the position peaks gives the direction and magnitude of offset of the head from the center of the tribit track. The head is over the center of the tribit track when the two position peaks are equal in size.

The above is by way of illustration. In practice the positions of track components 10a and 10b may be reversed, as may the direction of motion of the disc.

ACTION OF THE PEAK DETECTOR, 14

Figure 5:
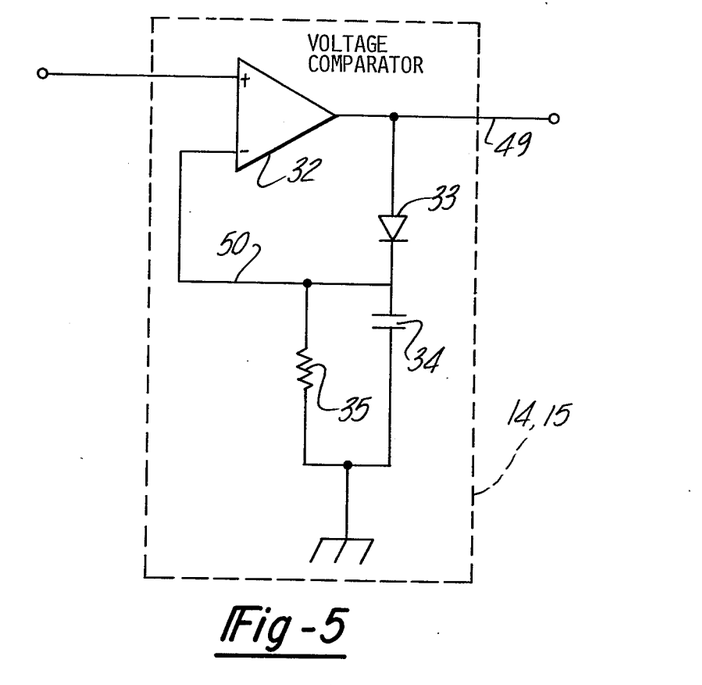
FIG. 5 shows one of several forms of peak detector which may be used in the apparatus of FIG. 1 and in the present invention.

The peak detector of the preferred embodiment is shown in FIG. 5. The voltage comparator, 32 gives a logic true, (positive) output voltage whenever its + input is more positive than its − input. Whenever the output of the comparator, 32, is positive, current flows through the diode, 33 to charge capacitor, 34. The potential on capacitor 34 is transferred by connecting link 50 to the − input of the comparator. When capacitor 34 has charged up to the same potential as the input potential on the + pin of comparator, 32, the output of the comparator switches to logic false (zero or negative potential). Thus the comparator emits one short pulse.

The behavior of this device in a stream of pulses is illustrated in FIG. 11. FIG. 11a shows how the capacitor, 34, charges to the peak value of the larger pulse, 40, with the emission of a short output pulse at the peak. Between pulses the capacitor, 34, discharges at a rate dependant on the value of capacitor, 34, and resistor 35. Because peak 39 of the input, is not as large as the falling potential on capacitor, 34, the comparator does not give an output for this peak.

Figure 11A:
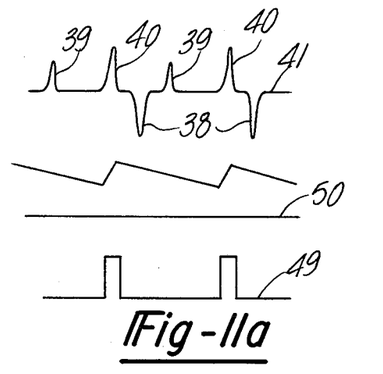
FIGS. 11a to 11e show voltage waveforms at two points marked in FIG. 5 illustrating action of the peak detector of FIG. 5 (a) when the transducer is far from the center of the tribit track; (b) when the transducer is nearer the center of the tribit track, (c) when the transducer is over the center of the tribit track, (d) when the transducer is a little way beyond the center of the tribit track, (e) when the transducer is far beyond the center of the tribit track.
Figure 11B:
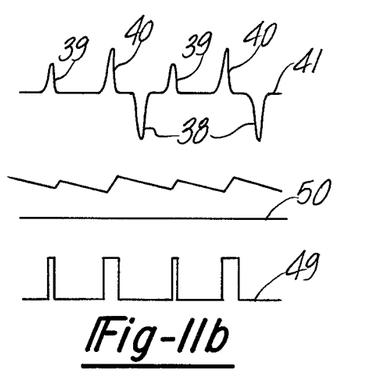

FIG. 11b shows a situation where pulses 39 and 40 are not so different in value. This time, pulse 39 is greater than the falling voltage on capacator 34, and so fires the comparator. Capacator 34 is charged to the value of peak 39. The output pulse for peak 39 has a shorter time duration than the output pulse for peak 40.

Figure 11C:
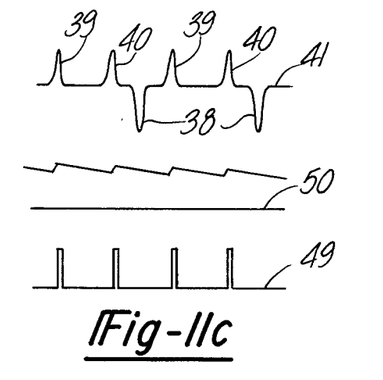

FIG. 11c shows how, when peaks 39 and 40 are the same size, the output pulses corresponding to each peak are the same width.

Figure 11D:
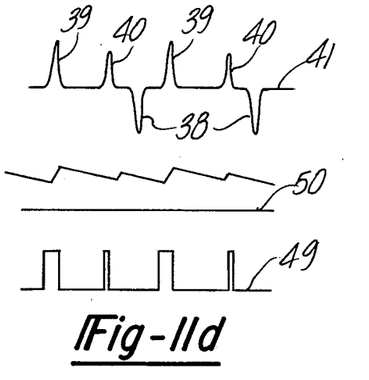

The situation shown in FIG. 11d is the reverse of that shown in 11b. Pulse 39 is now larger than pulse 40. The same argument applies. The comparator output pulse for peak 39 is fatter than that for peak 40.

Figure 11E:
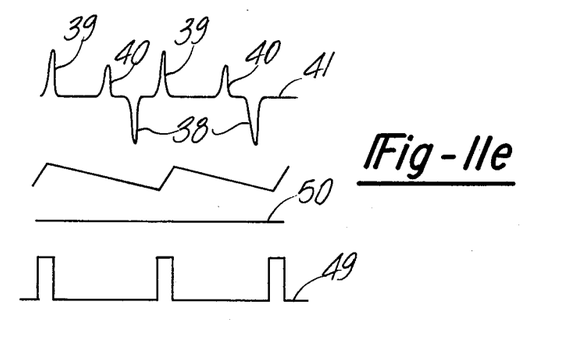

FIG. 11e shows the reverse situation to that of FIG. 11a. Pulse 39 is now much larger than pulse 40. No output occurs on pulse 40.

This peak detector acts on the tribits in such a way that the relative amplitude of the position pulses of the tribit signal is converted into a pulse-width-modulated signal which saturates at a relative height difference between the two position pulses dependant on the time constant, CxR, of the capacitor 34 and resistor 34 of FIG. 5.

The peak detector is sensitive only to the positive peaks of the incoming signal.

ACTION OF PEAK DETECTOR, 15

The peak detector 15 is identical in its operation to peak detector 14. It detects the timing peaks (38) of the tribit signal. Since there is only one kind of timing peak, a logic pulse is formed at the output for every timing peak on the input.

ACTION OF AMPLIFIER, 13

The amplifier, 13, accepts the head (12) readback signal and amplifies it so that the position peaks are positive on connector 41 and the timing peaks are positive on connector 42.

ACTION OF WINDOW GENERATOR, 16

Figure 6:
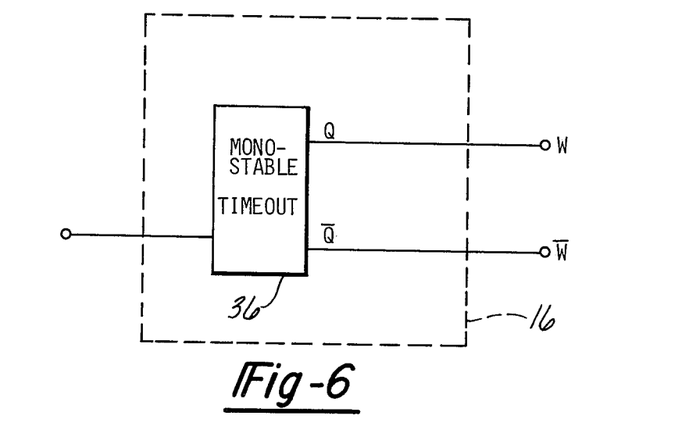
FIG. 6 shows one of several forms of window generator which may be used in the apparatus of FIG. 1 and in the present invention.

The window generator, 16, accepts the pulses that occur on each timing peak from peak detector, 15, expanding the pulse to be approximately half as long as the time between successive timing peaks. FIG. 6 shows how a monostable timeout, 36, is used to this end.

ACTION OF PULSE SEPARATOR, 17

Figure 8:
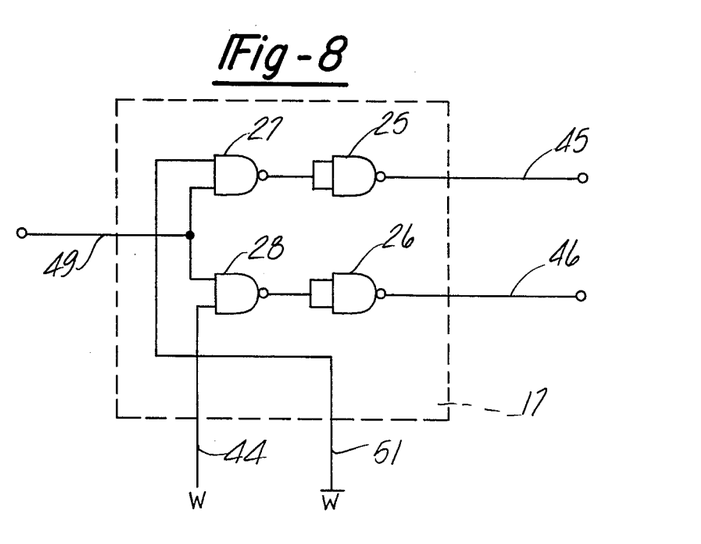
FIG. 8 shows one of many forms of pulse separator which may be used in the apparatus of FIG. 1 and in the present invention.

FIG. 8 show the separator logic in essence, two "and" gates are employed. Nand gates 27 and 25 form gate 1, nand gates 28 and 26 form gate 2. The window logic opens gate 2 for the first half of the period between timing peaks, and gate 1 for the second half. The output pulses of the position peak detector, 14, are connected to the inputs of both gates. Thus the output pulses of peak detector 14 corresponding to the first position peak, 39, of the tribit signal are directed through gate 2 to appear on connector 46, and the output pulses of peak detector 14 corresponding to the second position peak, 40, of the tribit signal, are directed through gate 1 to appear on connector 45. Pulse separation is thus achieved.

ACTION OF THE DIODE LOW PASS FILTERS (18 & 19)

Figure 7:
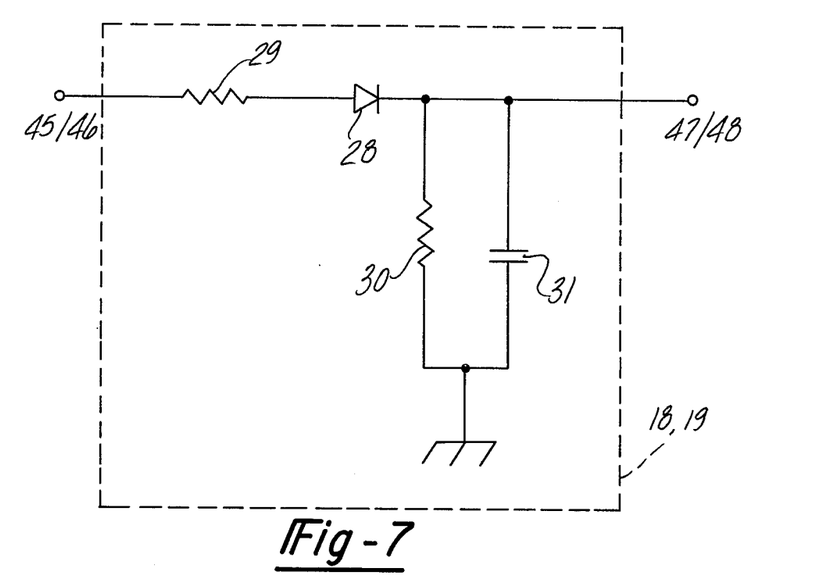
FIG. 7 shows one of several forms of filter which may be used in the apparatus of FIG. 1 and in the present invention.

The diode low pass filter is shown in FIG. 7. Both filters in FIG. 1, (18 and 19) are identical to it. An incoming positive pulse causes capacitor, 31, to charge through resistor 29 and diode, 28, with a time constant set by the value of resistor 29 in parallel with resistor 30, multiplied by the value of the capacator 31. When the positive pulse is removed from the input, diode 28 shuts off and capacator, 31, discharges through resistor, 30, with a time constant set by the value of resistor, 30, multiplied by the value of capacator, 31. It is arranged that resistor 30 is higher in value than resistor 29. The capacator, 31, discharges more slowly than it charges. This causes a voltage to appear across the capacator which is a multiple of the mean value of the input.

Because of the forward conduction potential of the diode, 28, it also serves to swamp any variation in the low level of the outputs of the pulse separator, 17.

ACTION OF THE VOLTAGE COMPARISON CIRCUIT, (20)

Figure 9:
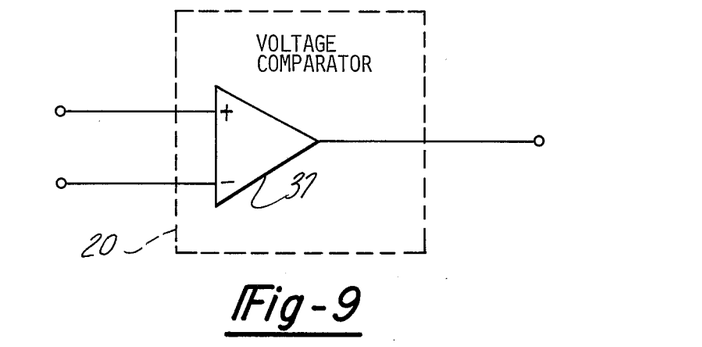
FIG. 9 shows one of many possible voltage comparison circuits which may be used in the apparatus of FIG. 1.

The voltage comparison circuit (20) is shown in FIG. 9. The inputs of the comparator are connected to the outputs of the filters described above. If the output of the filter connected to the + input of the comparator is more positive, than the output of the filter connected to the − input of the comparator the output of the comparator goes true, and vice versa. A logic signal is thus generated indicating the relative outputs of the filters and thus the relative sizes of the tribit peak.

OPERATION OF THE SYSTEM

Figure 10:
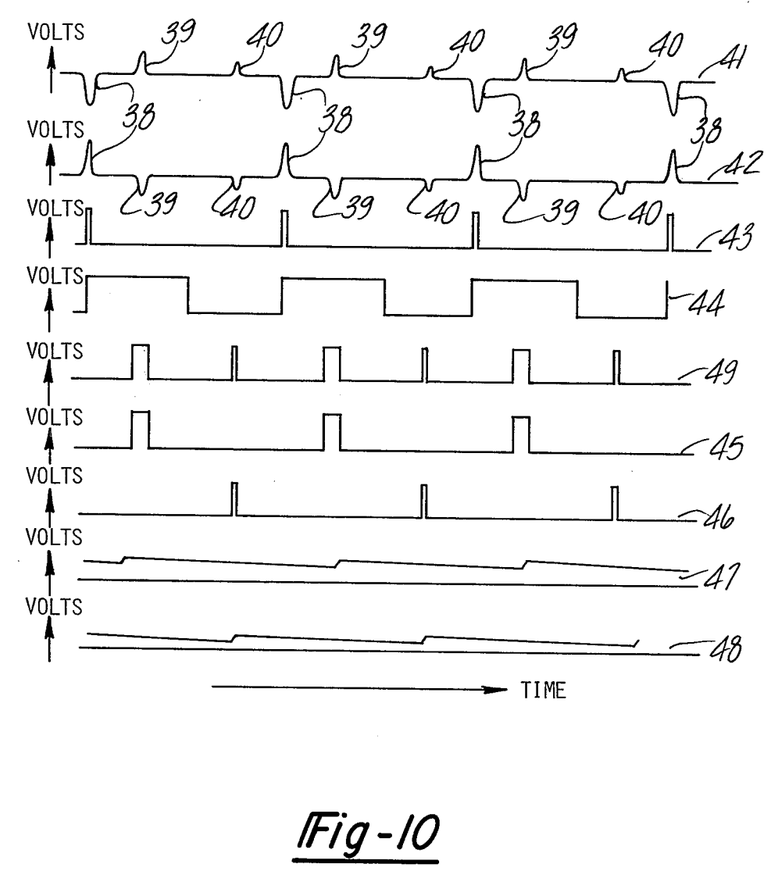
FIG. 10 shows voltage waveforms to be encountered at correspondingly marked points of FIG. 1.

FIG. 10 shows the voltage waveforms to be encountered on the connectors indicated in FIG. 1.

The readback signal of the head, 12, is connected to amplifier, 13. The amplifier gives two outputs, one the inverse of the other, on connectors 41 and 42. The amplified signal on connector 41 has the position peaks of the tribit signal, 39 and 40 positive. This signal is connected to the peak detector, 14, which detects the position peaks. The amplified signal on connector 42 has the timing peaks, 38, of the tribit signal positive. This signal is connected to the peak detector, 15, which detects the timing peaks.

The peak detector for the position peaks, 14, gives on output on connector 49 with a short logic pulse alternating in width between wider and narrow on successive pulses. The width of each pulse depends on the relative amplitude of the tribit position pulse that causes it.

The peak detector 15 for the timing peaks, 38 gives out a succession of short logic pulses on conductor 43, one for every timing peak of the tribit signal. The signal on connector 43 is connected to and actuates the window generator which puts out a window signal on connector 44 and its logical inverse on connector 51. The window signal changes about halfway between the timing peaks. This allows separation of the two interlaced pulse streams found on connector 49.

The pulse separator, 17, gates the window signal and its inverse, found on connectors 44 and 51 respectively, with the output of the position peak detector, 14, on connector 49.

The result is two separate pulse streams on connectors 45 and 46 where all the output pulses of the peak detector, 14, caused by the first position peak of the tribit signal, 39, are segregated from the output pulses caused by the second position peak of the tribit signal, 40, or vice versa.

Low pass diode filters, 18 and 19, then filter the signals on connectors 46 and 45 respectively. Both filters are identical, their outputs being a multiplied average of the input pulse stream. These signals appear on connectors 47 and 48. In FIG. 10, the ripple of each filters output has been grossly exaggerated to indicate its presence. The signals shown in FIG. 10 are in true relationship to one another.

Figure 12:
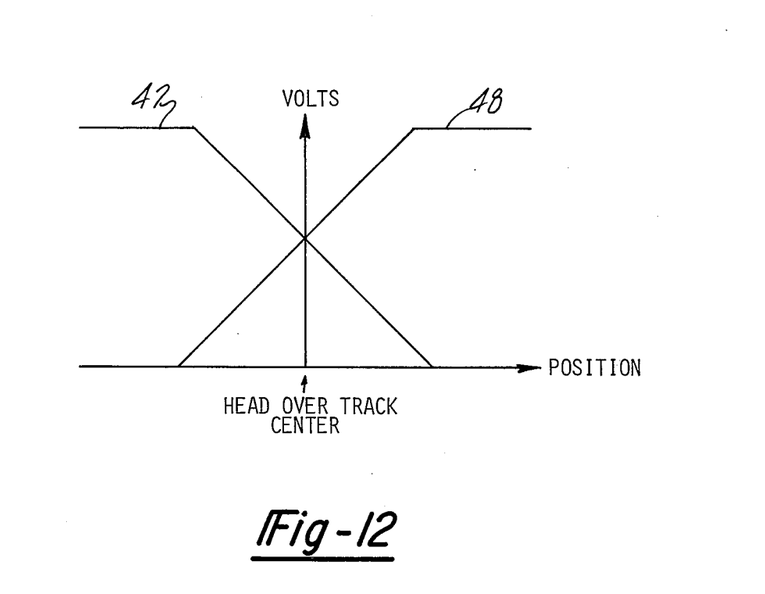
FIG. 12 illustrates the voltages at the output filters as the head moves across the tribit track.

FIG. 12 illustrates the voltages found at the output of the filters, 19 and 18 on connectors 47 and 48 respectively, as the head, 12, moves across the tribit track, 10. Moving from left to right, the flat zone of the signal on connector 47 indicates that the second position peak, 40 is too small relative to the first position peak, 34 to cause peak detector, 14, to show an output on that peak, 40. As the head, 12, approaches the center of the tribit track, 10, the second position peak, 40, increases in size. When it is just large enough to cause an output on peak detector, 14, the voltage on connector 47 begins to fall and that on connector 48 begins to rise. The voltages change as shown in FIG. 12 until the second position peak, 40, is so much larger at the right of the diagram than the first position peak, 39, that the first position peak, 39, can no longer cause an output on peak detector, 14. The signal on connector 47 falls to zero and the signal on connector 48 flattens out.

The center of the tribit track, 10, is indicated when the signals on connectors 47 and 48 are equal.

Connectors 47 and 48 are connected to the voltage comparison circuit, 20. The comparator, 37 (of FIG. 9) switches output state as the head, 12, crossed the center of the tribit track, 10. This output is a logic signal coupled to the disc file controller, 22.

By coupling to the head position servo, 21, the controller may move the head, 12, and by monitoring the output of the voltage comparison circuit, establish the center point of the tribit track, 10.

What I claim is:

1. A tribit decoder for determining the displacement of a transducer from a sync track, said tribit decoder comprising:

a detector means, receiving analogue signals from the transducer for producing pulse width modulated pulses, the width of the pulse depends on the relative amplitude between successive tribit position peaks;

a pulse separation means, connected to said detector means for dividing the output of said detector means into a first and second pulse stream, each of said pulse streams corresponds to a particular tribit position peak; and, a comparison means, receives as inputs said first and second pulse streams, for comparing pulse characteristics from said first pulse stream with pulse characteristics from said second pulse stream and producing an output signal indicating the displacement of the transducer from the center of a sync track.

2. The apparatus of claim 1 in which said comparison means further comprises:

a first filter means, connected to said first pulse stream for producing an output voltage representative of the mean value of such pulse;

a second filter means, connected to said second pulse stream, for producing an output voltage, representative of the means value of each pulse; and a voltage amplifier, coupled to said first and second filter means, for producing an output indicative of the relative output voltage between said first and second filter means.

3. The apparatus of claim 1 in which said comparison means further comprises:

a first filter means, connected to said first pulse stream, for producing an output voltage representation of the mean value of each pulse;

a second filter means, connected to said second pulse stream, for producing an output voltage representative of the means value of each pulse; and, a voltage comparison circuit, coupled to said first and second filter means and producing an output indicative of the relationship between said first and second filter means.

4. The apparatus of claim 1, in which said comparison means further comprises:

an interpretational logic means, connected to said pulse separator for examining the mutuality or exclusivity of pulses in said first and second pulse streams and producing outputs indicative of transducer location relative to sync track.

5. The apparatus of claim 1 in which said pulse separation means further comprises:

a timing detector, receiving analogue signals from the transducer and producing an output pulse at the coincidence of the tribit sync pulse;

a window generator coupled to said timing detector, and producing two logical signals, one the logical inverse of the other, so that the first of said logic signals will be positive during the first half of the period between tribit timing pulses, and the second of said logic signals will be positive during the second half; and, a pulse separator circuit containing a first and second gate which connects to said detector means and receiving logic signals from said window generator, said first gate is triggered by said first logic signal and said second gate is triggered by said second logic signals, and dividing the output from said detector means into said first and second pulse streams, each of said streams corresponding to a particular tribit position pulse.

6. A tribit decoder for determining the displacement of a transducer from a sync track, said tribit decoder comprising:

an amplifier, connected to said transducer, produces a first and second output signal, for said first output signal the position peaks are positive and for said second output signal said timing peaks are positive;

a first detector means receiving analogue signals from said first output of said amplifier for producing pulse width modulated pulses, the width of the pulses depends on the relative amplitude between successive tribit position peaks;

a second detector means receiving analogue signals from said second output of said amplifier for producing an output pulse at the coincidence of the tribit timing pulse;

a window generator, coupled to said second detector means, and producing two logical signals, one the logical inverse of the other, so that the first of said logic signals will be positive during the first half of the period between tribit timing pulses and the second of said logic signals will be positive during the second half;

a pulse separator circuit, containing a first and second gate, which connects to said first detector means and receives logic signals from said window generator, said first gate is triggered by said first logic signal and said second gate is triggered by said second logic signals and dividing the output from said first detector means into a first and second pulse stream, each of said streams corresponding to a particular tribit position peak;

a first filter means, connected to said first pulse stream, for producing an output voltage representative of the means value of each pulse;

a second filter means, connected to said second pulse stream, for producing an output voltage representative of the means value of each pulse; and, a voltage comparison circuit, coupled to said first and second filter means, and producing an output indicating the displacement of the transducer from the center of the sync track.

* * * * *